United States Patent [19]

Baudoin

[11] Patent Number: 4,676,766
[45] Date of Patent: Jun. 30, 1987

[54] CONTROL DEVICE OF A CONTINUOUS TRANSMISSION

[75] Inventor: Patrice Baudoin, L'Etang La Ville, France

[73] Assignee: Regie Nationale des Usines Renault, Boulogne-Billancourt, France

[21] Appl. No.: 780,002

[22] Filed: Sep. 25, 1985

[30] Foreign Application Priority Data

Sep. 25, 1984 [FR] France ................ 84 14689

[51] Int. Cl.⁴ ............................................. F16H 11/02
[52] U.S. Cl. ......................................................... 474/1
[58] Field of Search .................. 474/69, 70, 77, 28, 474/11, 1

[56] References Cited

U.S. PATENT DOCUMENTS

| | | | |
|---|---|---|---|
| 2,542,351 | 2/1951 | Pease | 474/1 X |
| 2,932,216 | 4/1960 | Schou | 474/1 X |
| 2,996,934 | 8/1961 | White | 474/1 |
| 3,370,485 | 2/1968 | Carawan | 474/1 X |
| 3,670,594 | 6/1972 | Roper | 474/1 X |
| 3,715,928 | 2/1973 | Case et al. | 474/1 |
| 4,301,902 | 11/1981 | Gatsos et al. | 474/1 X |

FOREIGN PATENT DOCUMENTS 0096012 12/1983 European Pat. Off. ................ 474/1

Primary Examiner—Stephen J. Novosad
Assistant Examiner—Thuy M. Bui
Attorney, Agent, or Firm—Oblon, Fisher, Spivak, McClelland & Maier

[57] ABSTRACT

Control device of a continuous transmission associated with a heat engine and with a reversing converter whose turbine shaft is either made solid with the shaft of the reactor to obtain forward, or made solid with the housing to obtain reverse, characterized in that said control device generates an input speed set point of the variable speed drive (12) for reverse, which is different from the input speed set point of the variable speed drive for forward; so as to obtain, during the sliding time of the converter in reverse, a transmission ratio of the variable speed drive (12) which is lengthened and becomes longer than the one of forward.

7 Claims, 8 Drawing Figures

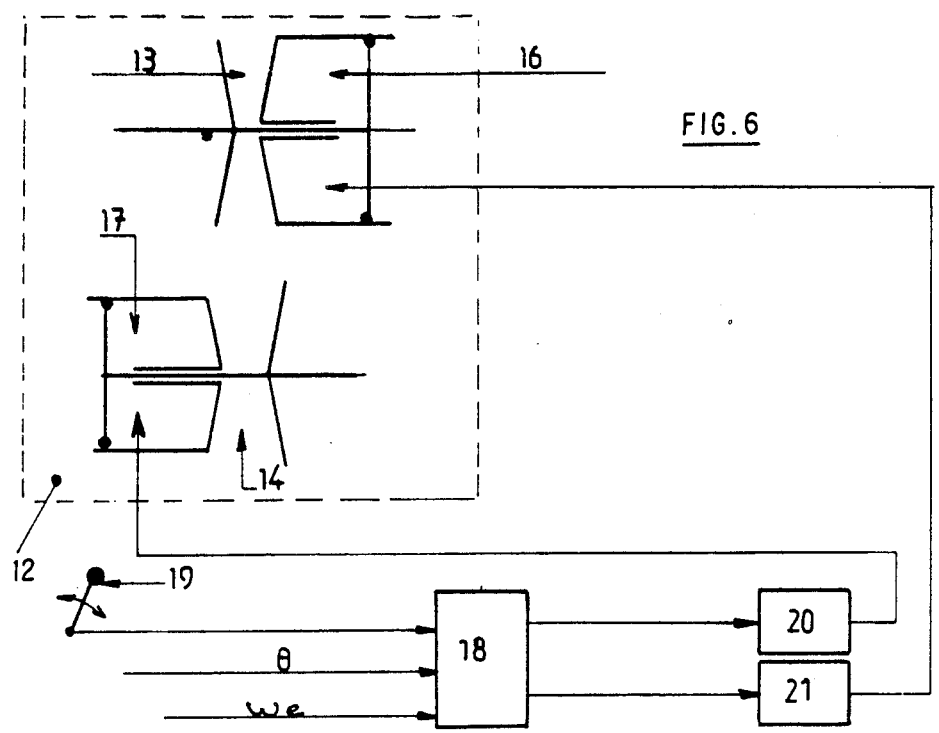
FIG. 6
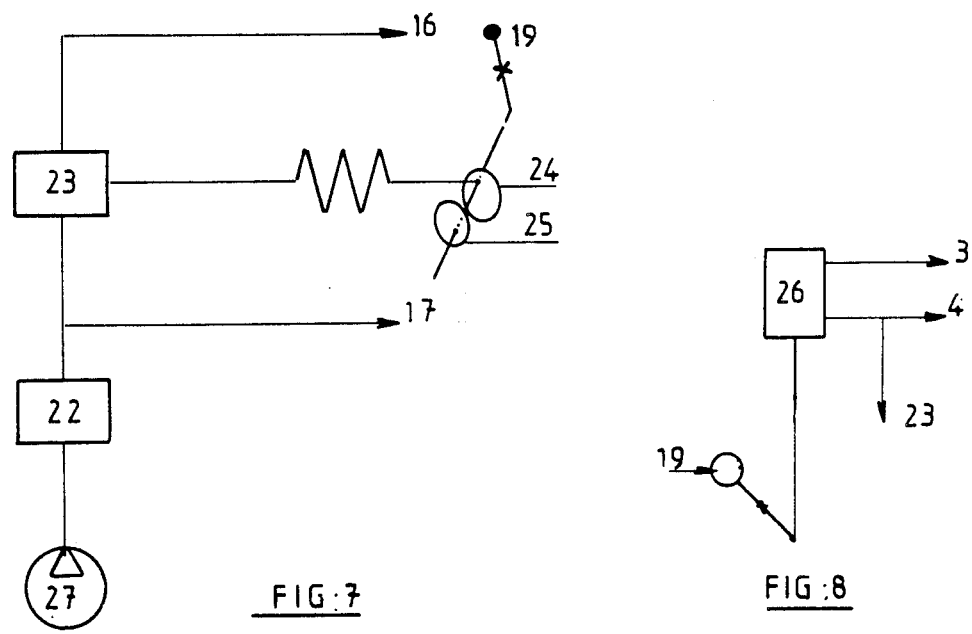
FIG. 7
FIG. 8

CONTROL DEVICE OF A CONTINUOUS TRANSMISSION

This invention relates to a control device of a continuous transmission, associated with a heat engine and with a reversing converter, that can provide optimized operation according to a predetermined criterion, such as for example a minimum energy consumption.

According to the invention, the control device relates to a continuous transmission associated with a heat engine and with a reversing converter whose turbine shaft is either made solid with the shaft of the reactor to obtain forward, or made solid with the housing to obtain reverse. The control device, according to the invention, generates an input speed set point for the variable speed drive for reverse, which is different from the input speed set point of the variable speed drive for forward; so as to obtain, during the sliding time of the converter in reverse, a transmission ratio of the variable speed drive which is longer than that of forward.

According to an embodiment of the invention, the device is made so that the speed set point is a function of the position of the feeding means of the engine, that can be computed from the usual characteristics of the engine, the converter and the variable speed drive so as to obtain the maximum performances.

According to an embodiment of the invention, the control device is applied to a belt variable speed drive or chain variable speed drive, whose pulleys are equipped with hydraulic jacks, said control device having to generate two pressures exerted respectively on the primary and secondary pulleys of said variable speed drive.

According to an embodiment of the invention, the control device comprises a logic unit associated with two solenoid valves for modulating the pressures; the logic unit receiving the position information of the selection lever, the information on the position of the feeding means of the heat engine, and the information on the input speed of the variable speed drive; so as to generate electrical signals on the solenoid valves to obtain the desired pressures, which vary according to otherwise known laws.

According to an embodiment of the invention, the control device comprises a first valve, which regulates the pressure of the jack of the first pulley, and a second valve which regulates the pressure of the jack of the second pulley; the position information of the selection lever being communicated to the first valve, by two different cams depending on whether the selection lever is in forward or in reverse.

According to an embodiment of the invention, a valve regulates the pressure of the jack of the first pulley, which is subjected to antagonistic forces connected, on the one hand, to the input speed of the variable speed drive and, on the other hand, to the position of the feeding means of the engine. This valve is subjected to a third force in reverse, said force being obtained by causing the feeding pressure of the brake to act on a suitable shoulder.

The invention will be better understood after studying the following detailed description made with reference to the accompanying drawings in which:

FIG. 6 shows a diagram of a transmission with reversing converter according to the invention;

FIG. 7 shows a diagram of a transmission according to a second embodiment of the invention;

FIG. 8 shows a diagram of a transmission according to a third embodiment of the invention;

Figure 1:
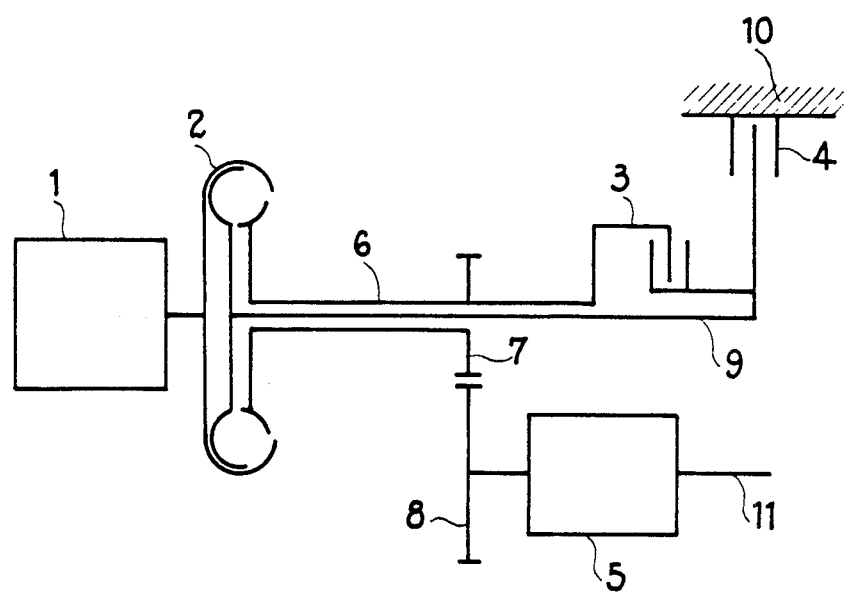
FIG. 1 shows a diagram of a transmission with converter.

Let us consider the engine transmission unit whose diagram is shown in FIG. 1. This engine transmission unit comprises:
a heat engine 1,
a hydrodynamic torque converter 2 with three elements,
a clutch 3,
a brake 4,
a transmission 5 driven by the shaft of reactor 6 by pinions 7 and 8.

Clutch 3 makes it possible to make turbine shaft 9 solid with the shaft of reactor 6. The converter then functions as a coupler.

Brake 4 makes it possible to immobilize turbine shaft 9 in relation to stationary housing 10. The converter then truly functions as a converter, i.e., with a conversion factor different from 1, but in this case the converter drives shaft 6 in the opposite direction.

This device, which is known, therefore makes possible the putting in rotation of an inertia, or the starting of a vehicle, which would be connected to output shaft 11 of transmission 5 by a suitable system, both in forward and reverse.

Figure 2:
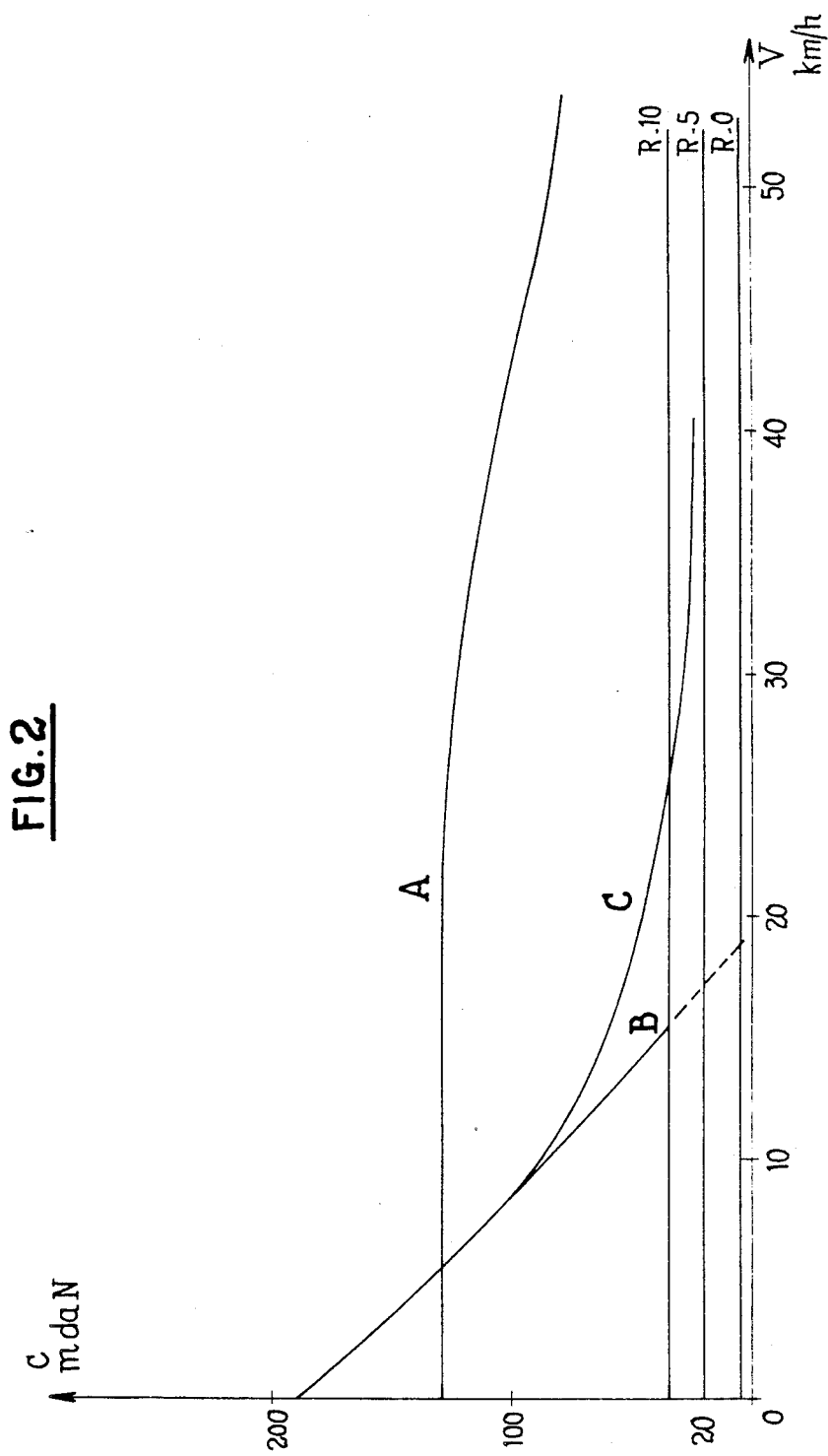
FIG. 2 shows the variation curves of the maximum wheel torque as a function of the speed of the vehicle.

FIG. 2 shows the maximum wheel torque C, which the device of FIG. 1 makes it possible to obtain on a vehicle, as a function of its speed V, the transmission being in its first gear. The vehicle has the following characteristics:
first gear: 7.5 km/hr for a speed of 1000 rpm of shaft 6,
expanded length of the pneumatic tires equals 1.76 m,
diameter of the converter equal to 227 mm.

Figure 3:
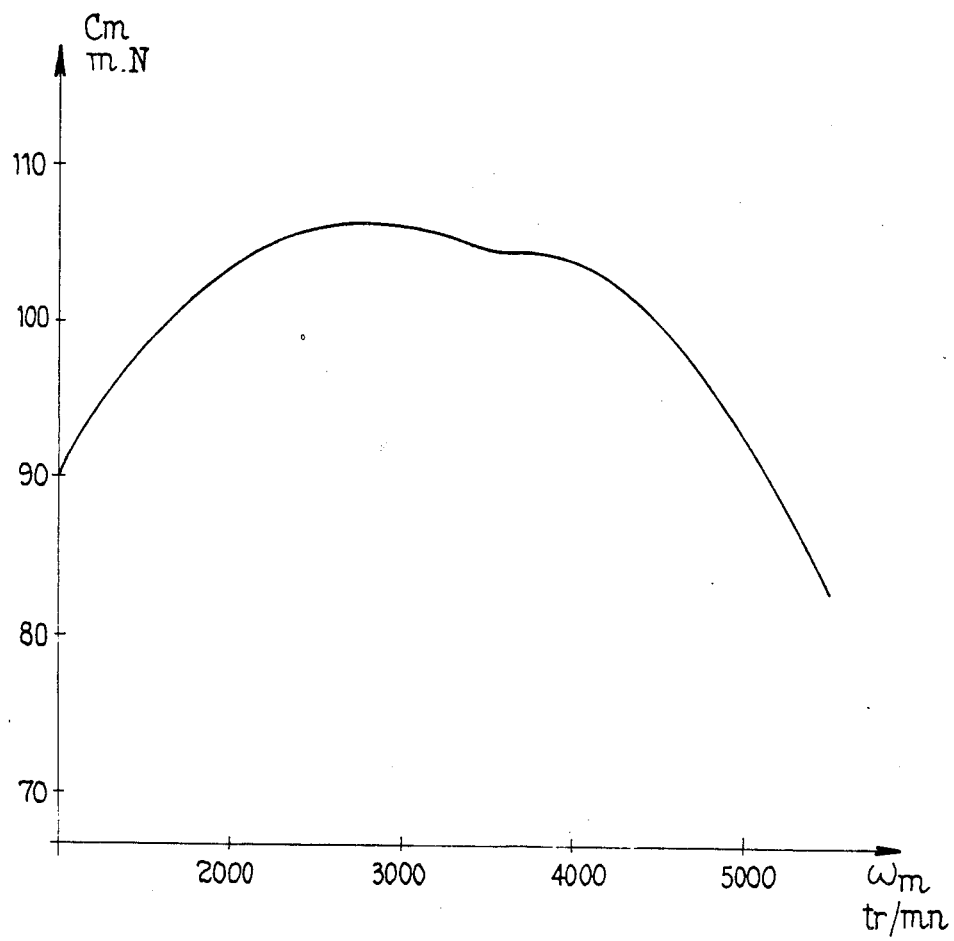
FIG. 3 shows the variation curve of the maximum engine torque as a function of the engine speed.

The variation curve of maximum engine torque $C_m$ as a function of the speed of the heat engine $\omega_m$ is given by FIG. 3.

The converter is designed to provide a stall speed of 2300 rpm.

In FIG. 2, curve A shows the maximum torque available at the wheels in forward. Curve B shows the maximum torque available at the wheels in reverse. Curve $R_0$ shows the torque necessary at the wheels for a vehicle having a weight of 1100 kg, on a zero incline. This vehicle has a resistance to rolling of 120 N/t, and an S. Cx of 0.592 m². Curves $R_5$ and $R_{10}$ are related to inclines 5 to 10%.

It is seen in FIG. 2, that the capabilities of the vehicle in reverse are limited:
to a limit speed on flat ground of 18.7 km/hr,
to a limit speed on a 5% incline of 17 km/hr,
to a limit speed on a 10% incline of 15.6 km/hr.

We know focus on the case where transmission 5 is replaced with a continuous transmission, for example with a variable speed drive 12, whose driving pulley 13 would be carried by shaft 6. We also assume that converter 2 is equipped with a bridging clutch 15, which makes it possible to cancel the sliding of said converter 2, when this converter becomes unnecessary, and thus to reduce consumption by the vehicle. These associations of heat engine with a reversing converter that can be bridged and variable speed drive are known.

In all cases of using the continuous transmission, a generally automatic device continuously regulates its transmission ratio, or better, its input speed $\omega_e$. Actually from the demand for power by the driver, expressed by the movement of a control, for example an accelerator pedal, regardless of the optimizing criterion of the operation of the motor, there can be computed:

an improved operating speed,
and a certain position for its feeding means.

This position is naturally therefore to be established by a suitable device and this improved speed is to be obtained by the continuous transmission, for which it constitutes an input speed set point, at least in bridged operation, since at that time the speed of the engine and the input speed of the continuous transmission are equal.

It is also easily established that even when the feeding means of the engine are controlled directly by the driver, the continuous transmission must be controlled so that its input speed is equal to a set point that is a function of the position of the feeding means of the engine.

Figure 4:
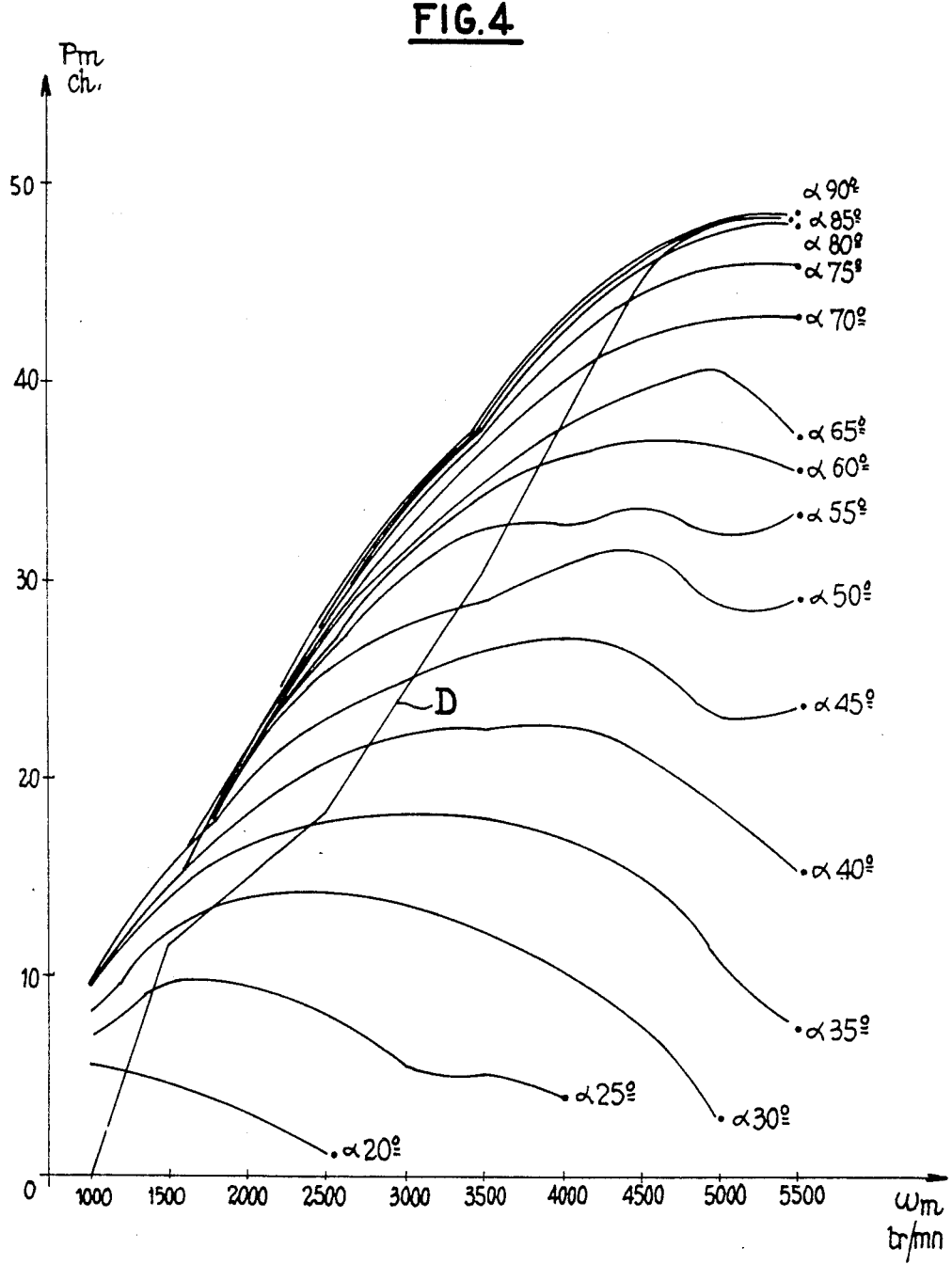
FIG. 4 shows the variation curves of the power of the engine as a function of the engine speed, and of the position of the feeding means.

FIG. 4 illustrates these remarks; it shows variation curves of the power of the engine $P_m$ as a function of the engine speed $\omega_m$ for various positions $\theta$ of its feeding means which, in the case of the figure, is the opening of the butterfly valve of carburetor $\alpha$. This FIG. 4 also shows a line D of improved operation for a criterion which is, for example, of smaller consumption. It appears that for any value of $\theta$, i.e., for any value of $\alpha$, there is a speed $\omega_m$, which places the point of operation of the engine on the line of improved operation. This speed is the engine speed set point, or input speed of the continuous transmission, when the converter is bridged.

Figure 5:
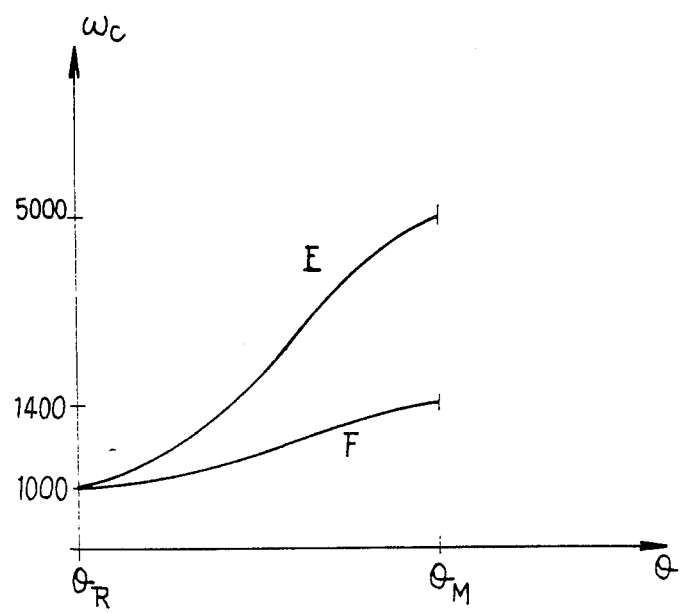
FIG. 5 shows the variation curve of a speed set point at the input of the variable speed drive as a function of the position of the feeding means.

Curve E of FIG. 5, indicates the standard course of such a correspondence between the value of a set point speed $\omega_c$, and the value of the position of feeding means $\theta$, at least in the case of optimizing criteria which are consumption, noise or even emissions. Thus we have:
for $\theta = \theta_{idle}$, $\omega_c = 1000$ rpm,
and for $\theta = \theta_{maximum}$, $\omega_c = 5000$ rpm, These values are related to standard enginings.

Now we return to the engine transmission unit consisting of a heat engine, a reversing converter that can be bridged, and a continuous transmission. Let us consider for this engine transmission unit, a starting in forward, with $\theta = \theta_{maximum}$. Therefore we will have as set point $\omega_c = 5000$ rpm. Now, during the entire coupling phase, for standard dimensions of the blades of the converter, the engine speed and the input speed of the continuous transmission will remain less than about 2500 rpm. During this entire phase, the control device of the variable speed drive will tend naturally to maintain the variable speed drive in its shortest gear which corresponds to the first gear of a manual transmission.

It will be the same for a starting in reverse. Since the input speed of the continuous transmission cannot reach the set point speed, it will remain in first, and the performances imparted to the vehicle will be the same as those previously computed, in the case of a transmission having a gear reduction of first identical with that of the shortest gear of the continuous transmission.

Thus, it appears that it is not necessary to have a strategy for controlling the continuous transmission in starting phase, which is different from the strategy defined for the normal bridged operation. Now, it has been able to be established that if during the conversion phase into reverse, the control strategy of the continuous transmission becomes that which is defined below, the characteristic of the wheel torque is improved as a function of the speed of the vehicle. This paradoxical strategy has the effect of causing the continuous transmission ratio to change to long gears. Thus the wheel torque increases when the continuous transmission ratio increases, while the wheel torque is naturally inversely proportional to the transmission ratio.

Curve C of FIG. 2 shows the corresponding improvement.

In FIG. 2 there is:
curve B corresponds to a transmission on its shortest gear according to the state of the art,
curve C corresponds to a transmission diverting toward longer gears.

This strategy further consists in having an input speed set point for the variable speed drive which is different from the one which is used so far. This input speed set point nevertheless remains a function of the position of the feeding means of the heat engine, aud defined from the engine curves and the characteristic curves of the converter.

The invention corresponds to the control of a continuous transmission associated with a heat engine and with a reversing converter which gives an input speed set point of the variable speed drive in reverse different from the input speed set point of the variable speed drive in forward; while in the state of the art the input speed set point of the variable speed drive is the same in forward and in reverse.

These two input speed set points of the variable speed drive for forward and reverse are functions of the position of the feeding means of the engine, or of the position of the power control element available to the driver, that can be improved by taking into account the temperature of the engine, the atmospheric pressure, etc.

The reverse set point whose course is given by curve F of FIG. 5 causes a change in the continuous transmission ratio from its shortest gear, during the convention phase, during a starting in reverse. For standard enginings, this curve F passes close to the following points:
$\theta = \theta_{idle}$, $\omega_c = 1000$ rpm,
and $\theta = \theta_{maximum}$, $\omega_c = 1500$ rpm.

Thus, curve F can be compared with curve E which represents the change in set point speed $\omega_c$ for the state of the art.

We will now describe by way of illustration three embodiments of the invention that apply to the case of a variable speed drive 12 with belts or with chains, whose pulleys 13 and 14 are equipped respectively with hydraulic jacks 16 and 17. The control system according to the invention then has to generate two pressures exerted respectively on the sliding blocks of pulleys 13 and 14.

Acoording to a first embodiment of the invention, a logic unit 18 receives data:
on the position of selection lever 19 (neutral, forward, reverse),
position of the accelerator or of the feeding means of the heat engine,
input speed of the variable speed drive $\omega_e$.

This logic unit 18 generates electrical signals for the two solenoid valves 20 and 21. These two solenoid valves 20 and 21 assure that the modulation of pressures $P_i$ and $P_j$ remains according to the following laws:

$P_i = f(\theta, \omega_m, \rho)$ on one of the two pulleys of the variable speed drive, $P_j = g(\theta, \omega_m, \rho) = \text{PID}(\omega_e - \omega_c)$ on the other pulley of the variable speed drive.

$\rho$ is the transmission ratio of the variable speed drive, and PID is the derived integral proportional correction.

Thus there will be avoided by pressure $P_i$ the sliding or the excessive overloading of variable speed drive 12, and the difference between the input speed $\omega_e$ of the variable speed drive and the set point speed $\omega_c$ to the extent of being cancelled by pressure $P_j$.

The derived integral proportional correction PID is determined by the relation:

$$-\text{PID}(\omega_e - \omega_c) = \alpha(\omega_e - \omega_c) + \beta \int (\omega_e - \omega_c)\, dt + \gamma \cdot d/dt\, (\omega_e - \omega_c).$$

In this relation $\alpha$, $\beta$, and $\gamma$ are coefficients controlled by the driver to give the desired stability, precision and speed to the regulation. In forward, $\omega_c$ is a function $f_1(\theta)$, and in reverse $\omega_c$ is a function $f_2(\theta)$.

In a second embodiment of the invention, an oil pump 27 generates a line pressure which is limited by a more or less improved first valve 22 which directly feeds jack 17 of receiving pulley 14 of variable speed drive 12, so that there is no prolonged sliding or exaggerated overloading. It should be noted that in certain particularly simple embodiments, locking is practically independent of the torque to be transmitted, while it theoretically should be proportional to it, which means that it is often very superabundant. This line pressure is sent on a second valve 23 which feeds jack 17 of driving pulley 13 so as to cancel the difference between the real input speed of the variable speed drive, and a set point speed $\omega_c$. Valve 23 is subjected to two antagonistic forces, one a function of the real spead created by the pressure sppplied by a Pitot pipe located on the input shaft of variable speed drive 12; the other force is a function of position $\theta$ of the feeding means of the engine by a mechanical system of the cam-spring type.

The set point input speed $\omega_c$ is therefore here a fixed function of said position. To attain the invention, it will be enough for example to connect selection lever 19 which is available to the driver, and which has the positions reverse-neutral-forward, to two different cams 24 and 25. One of these cams being retracted in favor of the other when selection lever 19 is moved from reverse position to forward position.

According to a third embodiment of the invention, the existence of a hydraulic valve 26 controls manually for feeding the jacks of clutch 3 and brake 4 associated with reversing converter 2 will be used. On the feed line of the jack of brake 4, for example, a bypass will bring the pressure to a shoulder, to be computed, of the slide of the second valve 23 cited above, so as to disturb the previously established balance. Thus valve 26 which regulates the pressure of jack 16 of primary pulley 13, and which is subjected to antagonistic forces connected, on the one hand, to the input speed of the variable speed drive and, on the other hand, to the position of the feeding means of the engine, is subjected to a third force in reverse, this force being obtained by causing the feeding pressure of brake 4 to act on a suitable shoulder.

I claim:

1. Control device of a continuous transmission, said transmission having a reactor and a housing, associated with a heat engine (1) and with a reversing converter (2) whose turbine shaft (9) is either made solid with the shaft of the reactor (6) to obtain forward, or made solid with the housing (10) to obtain reverse, characterized in that said control device generates an input speed set point $\omega_c$ of the variable speed drive (12) for reverse, which is different from the input speed set point of the variable speed drive for forward; so as to obtain, during the sliding time of the converter (2) in reverse, a transmission ratio of the variable speed drive (12) which is lengthened and becomes longer than the one of forward, all other parameters being equal.

2. Control device according to claim 1, wherein the speed set point $\omega_c$ is a function of the position $\theta$ of the driving means of the engine (1), that can be computed from the usual characteristics of the engine, the converter and the variable speed drive so as to obtain the maximum performances.

3. Control device according to claim 2, wherein the speed set point $\omega_c = f_2(\theta)$ varies according to a curve of the type of the curve F of the figure (5) for reverse, while the set point speed $\omega_c = f_1(\theta)$ varies according to a curve E of the figure (5) for forward.

4. Control device according to one of the preceding claims, wherein it is applied to a belt or chain variable speed drive (12), whose pulleys are equipped with hydraulic jacks (16 and 17), said control device having to generate two pressures $P_i$ and $P_j$ exerted respectively on the primary (13) and secondary (14) pulleys.

5. Control device according to claim 4, wherein it comprises a logic unit (18) associated with two solenoid valves (20 and 21) for modulating the pressures; the logic unit (18) receiving the position information of the selection lever (19) the position information of the feeding means $\theta$ of the heat engine (1) and the input speed information of the variable speed drive $\omega_e$ so as to generate electrical signals on the solenoid valves to obtain pressures $P_i$ and $P_j$ which vary according to the following laws:

$$-P_i = f(\theta, \omega_m, \rho)$$

$$-P_j = g(\theta, \omega_m, \rho) + \text{PID}(\omega_e - \omega_c)$$

$$-\text{PID}(\omega_e - \omega_c) = \alpha(\omega_e - \omega_c) + \beta \int (\omega_e - \omega_c)\, dt + \alpha d/dt\, (\omega_e - \omega_c).$$

6. Control device according to claim 4, wherein it comprises a valve (22) which regulates the pressure of the jack (17) of the second pulley (14) and a valve (23) which regulates the pressure of the jack (16) of the first pulley (13), the valve (23) being subjected to forces that are functions of the rotation of a cam (24) or of a cam (25) depending on whether the selection lever is in forward of in reverse.

7. Control device according to claim 4, wherein the valve (26) which regulates the pressure of the jack (16) of the primary pulley (13), and which is subjected to antagonistic forces connected, on the one hand, to the input speed of the variable speed drive and, on the other hand, to the position of the feeding means of the engine, is subjected to a third force in reverse, this force being obtained by causing the feeding pressure of the brake (4) to act on a suitable shoulder.

* * * * *